United States Patent [19]

Chiulli

[11] Patent Number: 4,652,412
[45] Date of Patent: Mar. 24, 1987

[54] METHOD FOR FORMING MICROPOROUS FILTER

[75] Inventor: Carl A. Chiulli, Randolph, Mass.

[73] Assignee: Polaroid Corporation, Cambridge, Mass.

[21] Appl. No.: 744,540

[22] Filed: Jun. 14, 1985

[51] Int. Cl.$^4$ .......................... C08J 9/26; B29C 59/02
[52] U.S. Cl. ................................ 264/49; 210/500.27; 210/652; 264/156
[58] Field of Search ............................... 264/49, 156; 210/500.27, 652

[56] References Cited

U.S. PATENT DOCUMENTS

| | | | |
|---|---|---|---|
| 4,038,351 | 7/1977 | Koenst, Jr. et al. | 264/45.1 |
| 4,211,590 | 7/1980 | Steward et al. | 264/156 X |
| 4,248,822 | 2/1981 | Schmidt | 264/156 X |
| 4,547,920 | 10/1985 | Hulsebusch et al. | 264/156 X |

Primary Examiner—Philip Anderson

[57] ABSTRACT

A surface-type microporous filter is prepared by embossing substantially uniform holes in an embossable polymer carried on a porous support wherein the pores are filled with a soluble filler. Subsequent to the embossing step, the filler is removed by dissolution.

8 Claims, 1 Drawing Figure

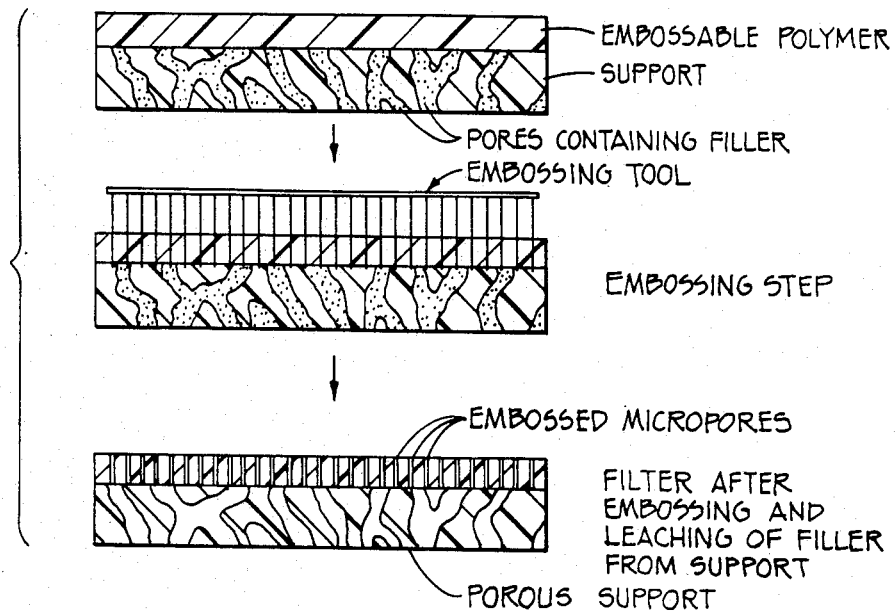

METHOD FOR FORMING MICROPOROUS FILTER

BACKGROUND OF THE INVENTION

Microporous filter media are employed for removing ultra-fine or microscopic particles from the medium from which they are suspended. As examples of particulate media which may be separated by such filters from the fluid environment in which they are disposed, mention may be made of bacteria, colloidal substances and the like.

Surface-type filters, while capable of efficiently filtering the materials of a relatively small size suffer from a deficiency or lack of uniformity of pore size, fragility as the pore size becomes more uniform and a relatively low percentage of open area. The term "open area", as used herein, is intended to refer to the voids or pores or openings in the filter unit in contrast to the closed or land areas intermediate the pores. It will be readily seen that the efficiency of a filter would increase with an increase in open area.

The term "surface-type filters", as used herein, is intended to refer to thin films having pores which extend from one surface to the other and function by trapping material on the upstream side of the filter. This is in contradistinction to depth-type filters which are relatively thick, posses pores of significant length and function by trapping materials within the filter element.

Copending application of Arthur M. Gerber, Ser. No. 601,857 filed Apr. 19, 1984 (common assignee) is directed to a surface-type filter having substantially uniform pore size of less than 10 micrometers and an open area of at least 10%. The filters are formed by embossing uniform holes in an embossable polymer. Thus, in one embodiment a layer of embossable polymer is carried on a temporary support which provides a base which can be penetrated by the embossing tool to insure that the pores in the embossable polymer extend from one surface to the other.

SUMMARY OF THE INVENTION

The present invention is directed to a method for preparing a surface-type filter which comprises the steps of
(1) embossing a layer of embossable polymer carried on a substantially smooth surfaced support, said support comprising a porous substrate which said pores contain a soluble filler, and
(2) subsequent to said embossing step dissolving said soluble filler.

BRIEF DESCRIPTION OF THE DRAWING

The drawing shows a diagramatic flow diagram of the method of the invention.

DETAILED DESCRIPTION OF THE INVENTION

In copending application Ser. No. 601,857, one embodiment of the claimed filter employs a high porosity support carrying the embossed layer. Such a support provides strength and dimensional stability to the pore-carrying layer. Forming the filter on a porous support, that is carrying out the embossing step while the embossable polymer is carried on a porous support presents some difficulties. The porosity of the substrate may cause nonuniformity in the embossable polymer carried on the surface of the substrate. In addition, the lamination or coating process may result in intrusion of portions of the embossable polymer into the voids or pores of the substrate. As a result, the foregoing problems would result in an embossing operation that would be incomplete and difficult to control.

The present invention provides for a smooth surfaced support to carry the embossable polymer which can be converted to a high-porosity support after it has functioned as a base for the embossing step. The support employed in the present invention comprises a porous substrate wherein the pores initially contain a filler which can be removed by dissolution or leaching subsequent to the embossing step. The filled pores provide a smooth surface to carry the embossable polymer and to insure uniform embossing. Subsequent to the embossing step, the filler is removed by contacting the substrate with a suitable solvent, thereby providing a porous base for the embossed filter layer.

The support can be formed by mixing a continuous phase with a discontinuous phase where the soluble filler comprises the discontinuous phase. Preferably, the porosity of the resulting support is greater than 50%.

As examples of suitable fillers for employment in the present invention, mention may be made of water-soluble polymer particles, such as polyvinyl alcohol, starches or non-aqueous solvent soluble fillers such as hydrocarbon waxes.

The porous support carrying the filter in the pores may comprise substantially any film-forming polymer, such as polyamides and cellulose acetate butyrate. Any suitable polymeric material may be employed as the support which is insoluble in the solvents for the filler.

The filler is removed by contacting the substrate with a solvent for the filler. Care must be taken to ensure that the particular solvent chosen is not detrimental to either the substrate or the embossed polymer layer. As examples of suitable filler-solvent combinations mention may be made of polyvinyl alcohol and water or hydrocarbon wax and organic solvent combinations.

The present invention is directed to a method for preparing a surface-type filter which contains substantially uniform size pores, an open area of at least 10% and a uniform distribution of pores. The novel method employed in forming the filters of the present invention enable one to distribute the pores in any pattern desired. This includes disposing the pores so that a "clump" of pores does not occur, as with prior art random methods. It will be understood, however, that the most efficient filter will consist of a close packing of the pores with a maximum of open area up to about 50%.

The filter layer of the present invention may be formed from any polymeric material which is initially embossable by an embossing tool. It should be understood that while the polymer employed in forming the filter of the present invention must be initially embossable, i.e., softenable by heat and/or solvent to permit an embossing tool to form the holes therein, the polymer may be subsequently cross-linked or hardened in some manner to provide additional strength and dimensional stability.

As stated above, substantially any pore size less than 10 micrometers may be chosen for the novel filter of the present invention. The pore size will be determined by the dimensions of the embossing tool employed in forming the pores in the embossable polymer layer. Particularly preferred are filters having a high ratio of open area and pores uniformly spaced apart. Such a filter can be readily made by embossing techniques of the present invention. The embossing tool may be formed by employing surface relief pattern techniques.

Thus, interference pattern exposure by a laser and development of a suitable photoresist provides a close packed array of holes as a relief pattern in the photoresist. Electroforming techniques are then employed to form a negative replica of the relief pattern. This negative pattern in metal constitutes the embossing tool and is employed to form the pores in the embossable polymer according to the methods of the present invention.

For example, a positive photoresist is coated on a support and then exposed to interfering laser beams of suitable wave length to solubilize the photoresist in a pattern corresponding to exposure intensity. This becomes a relief pattern upon development of the photoresist with a suitable developer. Silver is then deposited by vacuum deposition on the relief image in an amount sufficient to render the surface of the relief image electrically conductive. A nickel sulfamate-nickel chloride electroform solution is then employed to plate nickel over the silver relief pattern. The thus-formed nickel electroform, which now constitutes a negative image of the relief pattern, is removed and employed as an embossing tool. Preferably, the nickel electroform is formed in a drum configuration for ease and rapidity of embossing. By selecting the exposure system and development conditions, the size, spacing and distribution of the relief pattern can be selected, which in turn determines the dimensions and spacing of the elements in the embossing tool and ultimately the pores of the filter.

As examples of methods for producing the surface relief pattern which can be electroformed to form the embossing tool, reference may be made to U.S. Pat. No. No. 4,402,571, issued Sept. 6, 1983 to James J. Cowan, et al. and to copending application Ser. No. 454,728 filed Dec. 30, 1982, (common assignee) now U.S. Pat. No. 4,496,216, issued Jan. 29, 1985 both of which are incorporated by reference herein in their entirety.

The polymer employed in forming the filters of the present invention will be selected depending upon the particular medium in which the filter is to function. Thus, substantially any polymeric material may be employed, the only requirement being that it be initially embossable. As an example of a preferred polymer, mention may be made of cellulose acetate butyrate.

What is claimed is:

1. A method for preparing a surface-type filter which comprises embossing subtantially uniform holes through an embossable polymer carried on a substantially smooth surface support, said support comprising a porous substrate wherein said pores contain a soluble filler, and dissolving said filler subsequent to said embossing step.

2. The method of claim 1 wherein said embossed polymer layer has an open area of at least 10%.

3. The method of claim 1 wherein said filter has a uniform distribution of pores.

4. The method of claim 1 wherein said embossable polymer is cellulose acetate butyrate.

5. The method of claim 1 wherein said support is a polyamide.

6. The method of claim 5 wherein said support has a porosity of greater than 50%.

7. The method of claim 1 wherein said filler is polyvinyl alcohol.

8. The method of claim 7 wherein said filler is dissolved by contact with water.

* * * * *